United States Patent
Sanchez Gomez

(10) Patent No.: US 6,695,536 B2
(45) Date of Patent: Feb. 24, 2004

(54) FLOATING PLATFORM TO OBTAIN ELECTRIC POWER FROM SEA WAVES

(76) Inventor: Gines Sanchez Gomez, Calle Cervantes, 1, 7°, B, Mostoles (Madrid) 28.932 (ES)

( * ) Notice: Subject to any disclaimer, the term of this patent is extended or adjusted under 35 U.S.C. 154(b) by 42 days.

(21) Appl. No.: 10/095,592

(22) Filed: Mar. 12, 2002

(65) Prior Publication Data

US 2002/0131824 A1 Sep. 19, 2002

(30) Foreign Application Priority Data

Mar. 16, 2001 (ES) .......................... 200100640

(51) Int. Cl.[7] .............. F03B 13/14; E02B 9/08
(52) U.S. Cl. .............. 405/76; 290/42; 290/53
(58) Field of Search ............... 405/75, 76; 290/43, 290/54, 42, 53

(56) References Cited

U.S. PATENT DOCUMENTS

| 3,487,228 A | * | 12/1969 | Kriegel ................... 405/76 |
| 3,746,875 A | * | 7/1973 | Donatelli ................ 290/54 |
| 5,359,229 A | * | 10/1994 | Youngblood ............. 290/53 |
| 5,424,582 A | * | 6/1995 | Trepl et al. ............. 290/53 |
| 5,507,943 A | * | 4/1996 | Labrador ................. 405/76 |

* cited by examiner

*Primary Examiner*—Heather Shackelford
*Assistant Examiner*—Tara L. Mayo

(57) ABSTRACT

A floating platform is fixed to the sea bottom, provided with a lathe in that a cable is rolled up by a recoverable spring, they allow to transform the kinetic energy of the waves in electricity by connecting the axis of the lathe to an electricity generators, the electricity generators to a rectifier circuit, and the rectifier circuit to an electric accumulator.

9 Claims, 4 Drawing Sheets

FLOATING PLATFORM TO OBTAIN ELECTRIC POWER FROM SEA WAVES

CROSS-REFERENCE TO RELATED APPLICATIONS

The Spanish patent application P200100640 dated Mar. 16, 2001, is priority.

The Patent W9914489, priority date Sep. 18, 1997: a buoy, located near coast, it picks up wave movements being transmited said movements through levers.

The present invention, by using floating platforms, takes advantage of the kinetic energy of the sea. To pick up said kinetic energy they are provided lathes and cables, by generating circular movements that are transmitted to electric generators (essentially of direct current).

BRIEF SUMMARY OF THE INVENTION

A floating platform located on the sea surface it has many movements as tides, currents, waves, winds, etc. The oscillatory movements (waves) can be transformed in circular movements by providing a fixed benchmark, by example, by means of an anchorage from the platform to the sea bottom.

An appropriate system to pick up ah s oscillatory movements is by connecting anchorage on sea bottom to a cable. This cable rolls/unrolls up a lathe with a helical recoverable spring. The axis that picks up the movement can be in the platform or on the sea bottom.

The obtained circular movements, applied on an axis, they can become electric power easily.

It is not necessary that these circular movements are always in the same sense if the appropriate electric circuits are provided. So, a circular movement applied on a direct current generator produces an alternating current, and this AC, through a rectifier, it can load an accumulator.

It is possible to change the anchorage to bottom of the water by anchorage to a weight that rests on bottom of the water, being the weight sufficiently big.

Ending, the system can be adapted to use on deep bottoms, by example on high seas, by changing anchorage to bottom of water by a hanging weight, having the cable a certain length and elasticity.

DETAILED DESCRIPTION OF THE INVENTION

Figure 1:
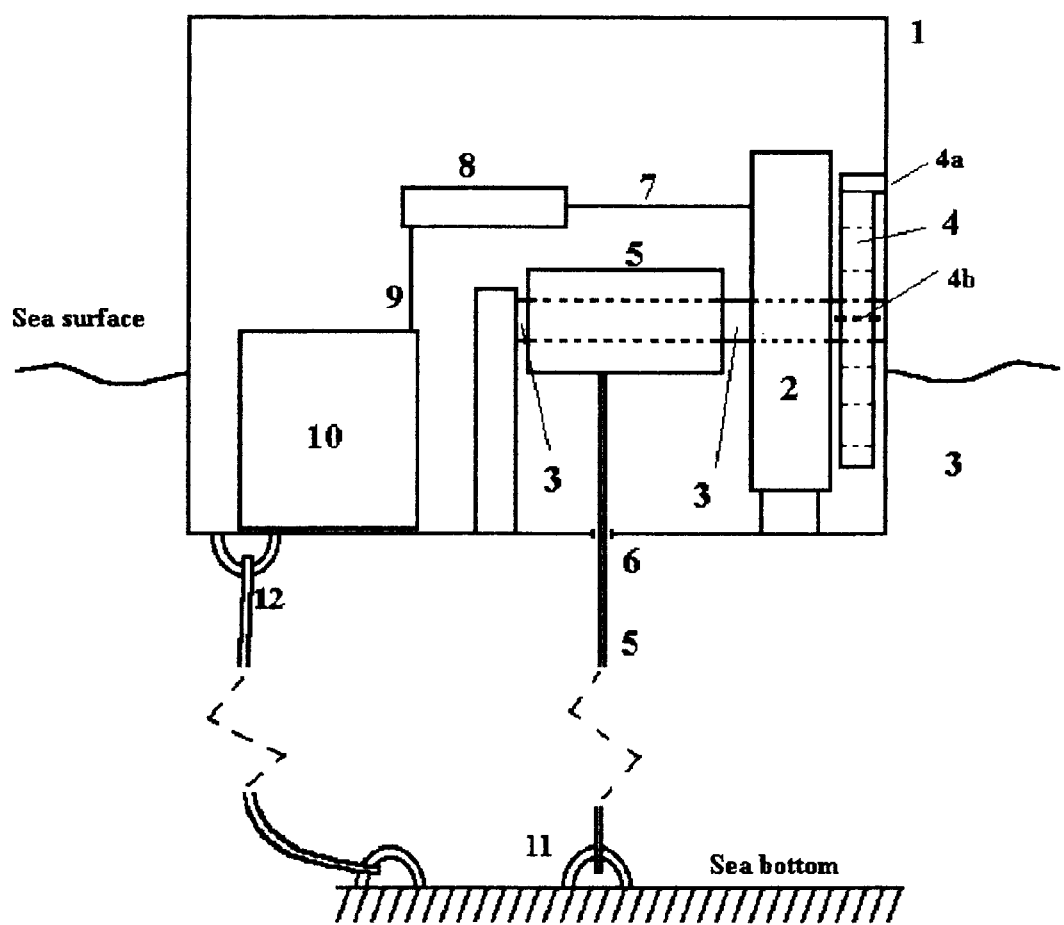
FIG. 1. Platform—buoy to obtain electric power.

The FIG. 1 schematizes a platform—buoy to obtain electric power.

The floating platform is formed by a buoy (1). Into the buoy there is a lathe (3), on this lathe rolls up a cable (5) through a hole (6). The cable is fixed to sea bottom by a ring (11), or by a big weight which cannot be moved by the movements of the platform. The cable length is the biggest height that can reach the platform, including action of waves, staying stretched in the valley of a wave by effect of a helical spring (4) which has one of its end fixed on the axis of the lathe (4b), being the other end of the helical spring fixed to the body of the buoy (4a). The axis of the lathe is connected to an electric generator (2) of direct current, this generator is connected to a rectifier (8) through an electric connection (7), and this rectifier is connected through other electric connection (9) to an accumulator battery (10).

The buoy also is provided with a security anchorage (12).

With the surfs, the platform raises and goes down, when the platform raises then the cable (5) is unrolled up on the lathe (3) and the helical spring (4) is expanded by the lathe movement, when said platform goes down then the helical spring (4) is released acting on the lathe (3) which rolles up the cable being induced a sway movement on said lathe and on its axis. By this sway movement of the axis of the lathe, the direct current generator (2) with is connected to said axis of the lathe generates an alternating current, this current is rectified and stored in the battery of the electric accumulator (10).

Figure 2:
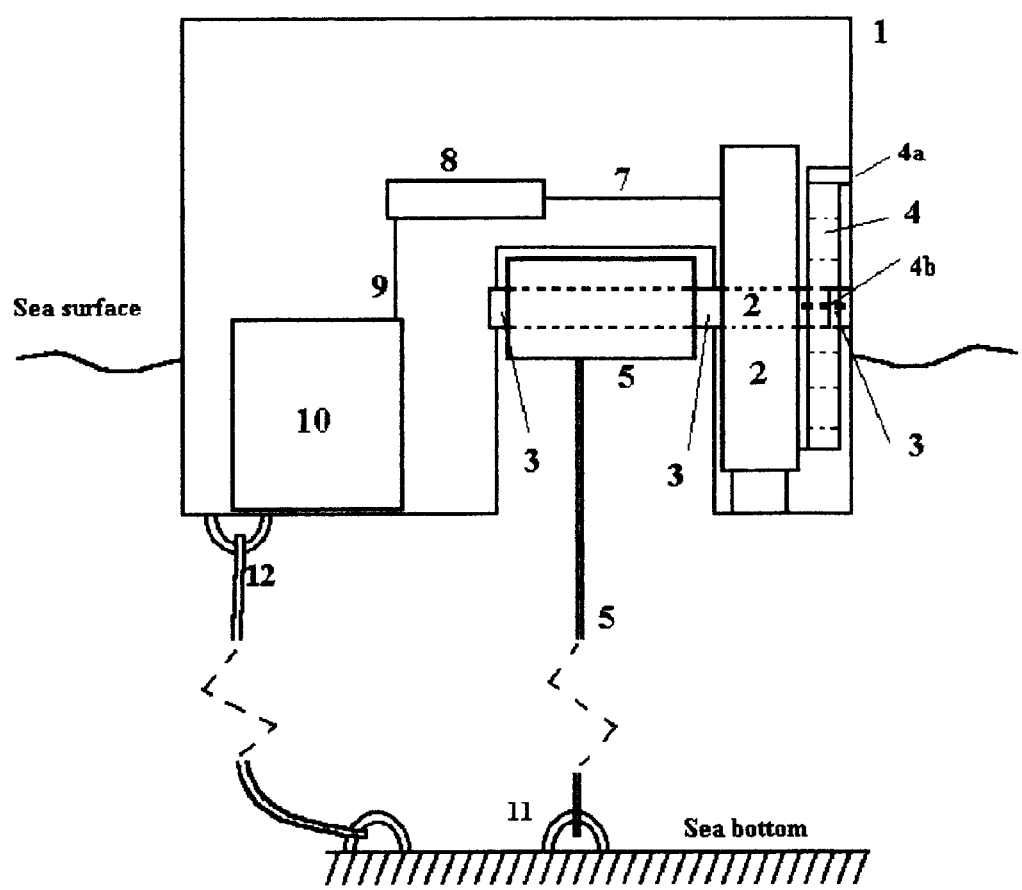
FIG. 2. Platform—buoy shaped as a inverted U.

The FIG. 2 schematizes a platform—buoy shaped as a inverted U.

The buoy must be shaped as a inverted U, placing between the sticks of the U the axis of the lathe, avoiding the hole.

Figure 3:
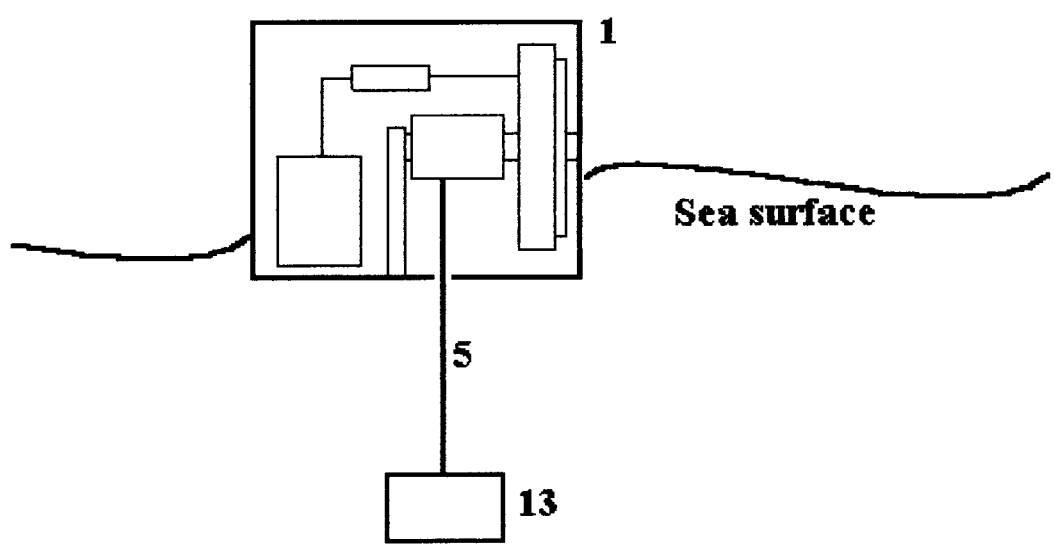
FIG. 3. Platform—buoy in deep water.

The FIG. 3 schematizes a platform—buoy in deep water.

It is possible the invention use in deep waters, by hanging a weight (13) from the cable, having the cable a suitable length. The inertia of the weight works as an anchorage.

Figure 4:
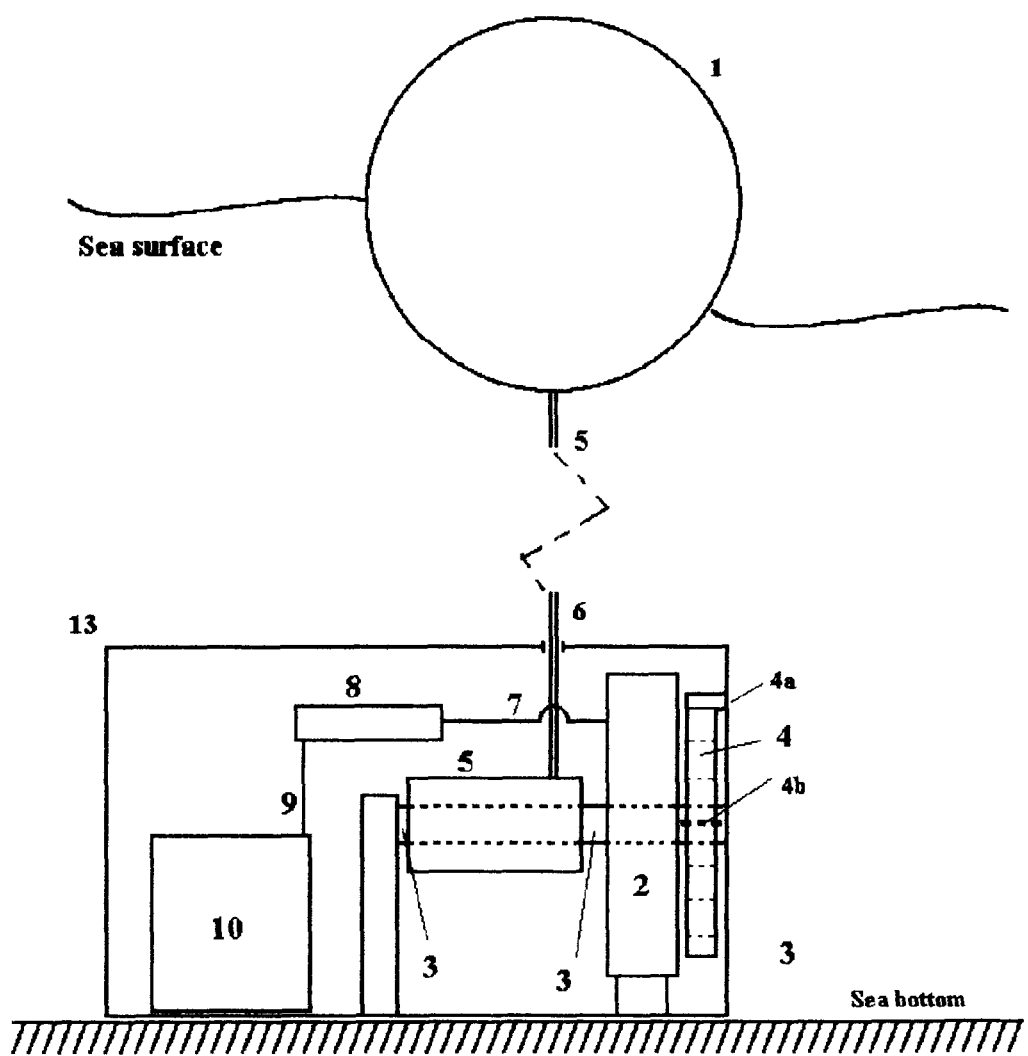
FIG. 4 Buoy anchored to a weight, being the weight the mechanisms of the invention.

The FIG. 4 schematizes a buoy anchored to a weight, being the weight the mechanisms of the invention.

Also the platform can be anchored to a weight. The weight can have some mechanisms of the invention, unloading the platform.

INDUSTRIAL APPLICATION

According with previous paragraphs it is possible to take advantage from sea surfaces.

In addition, if batteries of platforms with developed capacity to capture energy from waves are fixed near a coast, they can be used like a breakwater, because the platforms absorb a part of kinetic energy of waves.

A frequent special use can be when the captured energy is used in the own platform, like in a signaling buoy.

I claim for:

1. A method to obtain electric power from the kinetic energy of the sea waves characterized in that a floating platform is linked to a point placed at the sea bottom by a cable, the platform is moved with the oscillatory movement of the sea, the movement accommodated by the cable by rolling or unrolling up about the axis of a lathe having a recoverable helical spring, the lathe being on the platform or on the sea bottom, the movements picked up by the axis of the lathe feeds a direct current generator, and the generator feed a rectifier, the electric direct current from the rectifier feeds an accumulator.

2. The method to obtain electric power of the claim 1, characterized in that the link to the sea bottom is a connection to an anchorage weight resting on the sea bottom.

3. The method to obtain electric of the claim 1, characterized in that the cable is fixed to a weight hanging from the cable, the cable being elastical.

4. A floating platform to obtain electric power from the kinetic energy of the sea waves comprising a cable fixed to the sea bottom, the cable is connected to a lathe, rolling/unrolling up directly on said lathe, being the length of the cable the maximum from the sea bottom to the sea surface, including the height of the waves, the lathe having a recoverable helical spring to rolling up the remaining cable, the lathe being connected to a direct current generator, the direct current generators being connected to a rectifier, a security anchorage to the sea bottom, coast or another floating platform.

5. The floating platform of the claim 4, characterized in that the lathe and the electric generator are on the sea bottom, and the cable is fixed directly to the floating platform.

6. The floating platform of the claim 4, characterized in that the floating platform is a buoy.

7. The floating platform of the claim 6, characterized in that the buoy is shaped as an inverted U, having the fastening axis between the the two sticks of the inverted U rolling/unrolling up the cable externally to the buoy.

8. The floating platform of the claim 7, characterized to be for marine signaling, by auto-feeding of electricity.

9. The floating platform of the claim 6, characterized to be for marine signaling, by auto-feeding of electricity.

* * * * *